Figure 1:
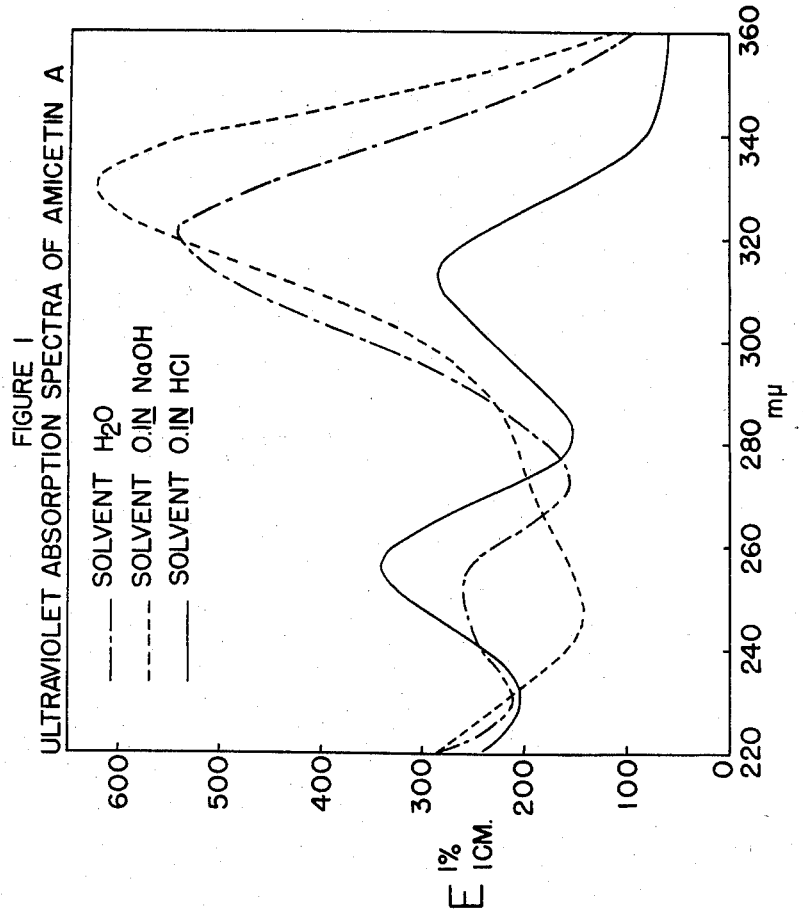

2,909,463
Patented Oct. 20, 1959

2,909,463

AMICETIN A AND ITS SALTS

Clarence De Boer and Jack W. Hinman, Kalamazoo Township, Kalamazoo County, Mich., assignors to The Upjohn Company, Kalamazoo, Mich., a corporation of Michigan Application August 13, 1953, Serial No. 374,111

5 Claims. (Cl. 167—65)

This invention relates to a new and useful antibiotic substance, amicetin A, obtained by the cultivation of *Streptomyces vinaceus-drappus,* a microorganism undescribed hitherto.

This application is a continuation-in-part of copending application, Serial No. 238,072, filed July 23, 1951.

It is an object of the present invention to provide a new and useful antibiotic substance possessing bacteriostatic or bacteriocidal activity against certain acid-fast bacteria and more particularly, mycobacteria. Another object of this invention is to provide a substance which is active against gram-negative and gram-positive bacteria. Other objects and features of the invention will be apparent to those skilled in the art to which this invention pertains.

The antibiotic of this invention has not yet been proved to have value in human therapy.

It has been found that by cultivating, under controlled conditions, a hitherto undescribed species of microorganism referred to as *Streptomyces vinaceus-drappus,* a novel antibiotic, amicetin A, is obtained. This microorganism was isolated from a sample of soil taken in Kalamazoo, Michigan. The chosen name of the new microorganism, *Streptomyces vinaceus-drappus,* characterizes the drab wine color (according to Ridgway, "Color Standards in Nomenclature") of its aerial mycelium and spores when cultured on a variety of media as set forth below. A culture of the living organism has been deposited with the Fermentation Division of the Northern Regional Research Laboratory at Peoria, Illinois, and has been added to its permanent collection as NRRL 2363.

A careful study of the morphology and physiology of *S. vinaceus-drappus* showed it to be distinctly different from any previously described species of Streptomyces. The description of the microorganism, according to Bergey's "Manual of Determinative Bacteriology," 6th edition, pages 929 to 933, is given below in tabular form, the reported colors being based on Ridgway's "Color Standards in Nomenclature." All seeding was done with a spore suspension, the test tubes containing the various culture media being incubated between 24 and 28 degrees centigrade. Readings were taken on the 4th, 7th, 15th and 22nd days.

*S. vinaceus-drappus* produces a long, filamentous mycelium, which branches profusely, and conidia in sinistrorse spiral chains. The spirals occur singly or in clusters and measure fifteen to twenty microns in length by three to five microns in width. Most of the spirals consist of three to four volutions. The hyphae are approximately 1.0 micron in width while the conidia are between 1.5 and 2.0 microns in diameter.

Although *S. vinaceus-drappus* is similar in some respects to *Streptomyces lavendulae,* these microorganisms are readily distinguishable not only by their differences in color (lavender vs. vinaceous-drab) but also by distinct differences in their cultural characteristics. These differences are set forth in the following table:

| S. lavendulae | S. vinaceus-drappus |
|---|---|
| Brown, water-soluble mycelial pigment. | no mycelial pigment. |
| Color change of gelatin from cream to brown. | no color change of gelatin. |
| Little growth on potato slant—little change in color. | heavy growth on potato slant—vinaceous-drab in color. |
| Oval shaped conidia. | spherical shaped conidia. |

TABLE I

*Cultural characteristics of* Streptomyces vinaceus-drappus

| Medium | Amount of Growth | Color of Aerial Mycelium and Spores | Soluble Pigment | Remarks |
|---|---|---|---|---|
| Casein Starch agar | Profuse | Light vinaceous drab | None | Colonies flat, smooth, entire. Partial starch hydrolysis. |
| Czapek's-Dox agar | Moderate | Pallid vinaceous drab | do | Cinnamon buff reverse. |
| Irish potato | Heavy | Pale vinaceous drab | do | Rugose surface. Exceptional growth and sporulation. |
| Sweet potato | do | Light vinaceous drab | do | Warty surface. Excellent growth and good sporulation. |
| Nutrient agar | Light | White | do | Chamois reverse. |
| Dextrose agar | Heavy | Quaker drab | do | Blackish-brown (2) reverse. |
| Tyrosine agar | Trace | No sporulation | do | Negative tyrosinase reaction. |
| Calcium malate | Moderate | Pale vinaceous drab | do | |
| Cellulose broth | Light | Pallid vinaceous drab | do | No decomposition of cellulose. |
| Starch agar | Moderate | White | do | Partial hydrolysis. Honey yellow reverse. |
| Nutrient broth | Slight | White-pallid vinaceous drab | do | Vegetative submerged growth. |
| Dextrose broth | Moderate | White | do | Do. |
| Nitrate broth | do | do | do | Reduces nitrates to nitrites. |
| Litmus milk | Light | Pallid vinaceous drab | do | Alkaline reaction, ring-like growth at surface. Gradual reduction, no visible coagulation. |
| Gelatin | do | Ivory | do | Slow liquefaction, pellicle growth. |

The invention is not to be limited to the production of amicetin A by *S. vinaceus-drappus* or to organisms fully answering the above description which are given merely for illustrative purposes only. Other microorganisms, i.e., mutants produced from *S. vinaceus-drappus* by exposure to various mutating agents such as X-radiation, ultraviolet light, high-speed electrons, nitrogen mustards, and the like, can also produce amicetin A.

Amicetin A can be obtained in either the amorphous or crystalline form. Amorphous amicetin A can be converted to the crystalline material by extracting an aqueous solution thereof with a solvent such as butanol, or the like, at a pH ranging between about 7.5 and about 9.0, separating the organic solvent phase, and extracting the organic solvent phase thus-obtained with dilute acid thereby transferring the antibiotic to the aqueous-acid phase. On adjusting the aqueous-acid solution thus-obtained to a pH varying between 7.0 and 9.0 followed by cooling thereof, amicetin A is obtained in substantially pure and crystalline form. Alternatively, amicetin A can be obtained in pure and crystalline form from the amorphous material by using the counter-current distribution technique of Craig, J. Biol. Chem., 155, 519 (1944).

Crystallization of amicetin A from aqueous solutions thereof or solutions containing some water generally yields a hydrated crystalline material. The amicetin A can be obtained in anhydrous form by drying the hydrated material at slightly elevated temperatures in vacuo or by crystallizing the material from a substantially anhydrous solvent such as obsolute methanol, ethanol, or the like.

Amicetin A usually separates from aqueous or predominantly aqueous solutions thereof in the form of tiny needles or clusters of needles. When collected on a filter, these crystals pack tightly together to form a glossy mat. After drying in a vacuum desiccator over anhydrous magnesium perchlorate at about room temperature, the hydrated crystals of amicetin A thus-obtained melt between 156 and 159 degrees centigrade, depending upon the size of crystals and the rate of heating.

Anhydrous crystals of amicetin A are obtained, as indicated above, by recrystallization of the hydrated crystalline material from substantially anhydrous solvents such as absolute methanol, ethanol, or the like, or by drying the hydrated product in vacuo to remove the water of crystallization. On recrystallizing the antibiotic from a substantially anhydrous methanol solution, the small, dense, anhydrous plates thus-obtained melt between 209 and 212 degrees centigrade.

Amicetin A is effective not only against various mycobacteria, notably *M. tuberculosis* (H37Rv), but it also inhibits the growth of gram-positive bacteria such as *Staphylococcus aureus, Bacillus subtilis*, and the like. The spectrum of amicetin A as compared with other clinically important antibiotics which show anti-mycobacterial activity is shown below:

*Acute toxicity of antibiotics*

[Mg. per kg. in mice]

| Antibiotic | Intra-venous $LD_{50}$ | Subcuta-neous $LD_{50}$ | Oral $LD_{50}$ |
|---|---|---|---|
| Streptomycin sulfate | 203 | 720 | >10,000 |
| Neomycin sulfate | 93 | 420 | 2,000–2,500 |
| Aureomycin hydrochloride | 134 | >300 | >2,500 |
| Terramycin | 178 | 800 | 6,700 |
| Netropsin | 17 | 70 | 3,800 |
| Amicetin | 90 | 600–700 | 2,200 |
| Amicetin A | 300 | ca. 850 | |

Amicetin A is a weakly basic compound. The crystalline free base is soluble in distilled water to the extent of only about 0.1 percent but is readily soluble in acid solutions. The crystalline hydrochloride of amicetin A may be obtained by dissolving the free base in a dilute hydrochloric acid solution, concentrating the solution to a small volume under reduced pressure and precipitating the resulting crystalline amicetin A hydrochloride by careful addition of acetone or a mixture of methanol and acetone. Alternatively, the aqueous solution of the hydrochloride may be freeze-dried and the resulting amorphous solid crystallized from methanol and acetone. The crystalline amicetin A hydrochloride is thus obtained in hydrated form. By a similar procedure, other acid salts of amicetin A such as amicetin A sulfate, amicetin A phosphate, and the like, can be likewise obtained in crystalline form.

The ultraviolet absorption spectrum of anhydrous crystalline amicetin A is shown in Fig. 1. When the spec-

TABLE II

*Micrograms of antibiotic per milliliter of nutrient broth necessary to inhibit growth of microorganisms*

| Bacteria | Amicetin [1] | Amicetin A | Strepto-mycin | Strepto-thricin | Neomycin | Terra-mycin | Aureo-mycin | Chloram-phenicol |
|---|---|---|---|---|---|---|---|---|
| A. Acid-fast: | | | | | | | | |
| *Mycobacterium tuberculosis* v. *hominis* (607) | 1.0 | 5.0 | 1.0 | 2.0 | 0.4 | 1.0 | 0.25 | 3.3 |
| *Mycobacterium tuberculosis* v. *hominis* H37Rv | 0.2–0.5 | 5–10 | 6.25 | 12.5–50 | 6.25–12.5 | 25 | 25–100 | 6.25–12.5 |
| *Mycobacterium avium* (7992) | 1.0 | 2.0 | 1.0 | 2.0 | 0.4 | 0.2 | 0.1 | 2.0 |
| B. Gram-positive: | | | | | | | | |
| *Staphylococcus aureus* (FDA-209) | 4.0 | >20 | 0.1 | 0.2 | 0.02 | 1.10 | .13 | 3.3 |
| *Bacillus subtilis* (Ill.) | 4.0 | 20 | 0.4 | 0.4 | 0.01 | 10 | .33 | 1.7 |
| C. Gram-negative: | | | | | | | | |
| *Escherichia coli* (26) | >50 | >20 | 1.0 | 1.0 | 0.1 | 2.5 | 1.0 | 1.7 |
| *Klebsiella pneumoniae* (10031) | 20 | >20 | >0.1 | 0.2 | 0.1 | 1.7 | 0.20 | 1.0 |
| *Pseudomonas aeruginosa* (9027) | >50 | >50 | 1.0 | 2.0 | 0.2 | 17 | 20 | 50 |
| *Salmonella schottmuelleri* (9149) | >50 | >50 | 4.0 | 0.2 | 0.1 | 4.0 | 1.1 | 3.3 |
| *Proteus vulgaris* (8427) | >50 | >50 | 0.2 | 0.1 | 0.1 | 17 | 2.0 | 1.0 |
| *Salmonella typhosa* (167) | 50 | >50 | 1.0 | 0.1 | 0.02 | 2.5 | .67 | 1.2 |

[1] The antibiotic described and claimed in parent copending application Serial No. 238,072, filed July 23, 1951.

An aerosol spray containing amicetin A, or a salt thereof, as the essential ingredient is useful in hospitals, especially in tuberculosis wards, to prevent or reduce the possibility of transmission of pathogenic organisms such as *M. tuberculosis* (H37Rv) and the like from patient to patient or from patient to doctor. Likewise, wash solutions containing amicetin A or a salt thereof are also useful for general sanitation purposes, for example, washing of hands or cleaning of equipment, floors or furnishings in tuberculosis wards, and also in laboratories experimenting with mycobacteria.

The toxicity of various antibiotics, including amicetin A, is given in the following table:

trum is determined in aqueous solution, maxima of $$E^{1\%}_{1\,cm.}=290$$

at 251 millimicrons and $$E^{1\%}_{1\,cm.}=540$$

at 320 millimicrons and minima values of $$E^{1\%}_{1\,cm.}=236$$

at 230 millimicrons and $$E^{1\%}_{1\,cm.}=176$$

at 272 millimicrons are observed. When the spectrum is determined in a 0.1 N hydrochloric acid solution, maxima of $$E_{1\,cm.}^{1\%} = 341$$

at 256 millimicrons and $$E_{1\,cm.}^{1\%} = 288$$

at 313 millimicrons are observed. The specific rotation of the anhydrous amicetin A in 0.1 N hydrochloric acid at $[\alpha]_D^{22°}$ = plus 138.8 degrees, at a concentration of 0.5 percent.

Figure 2:
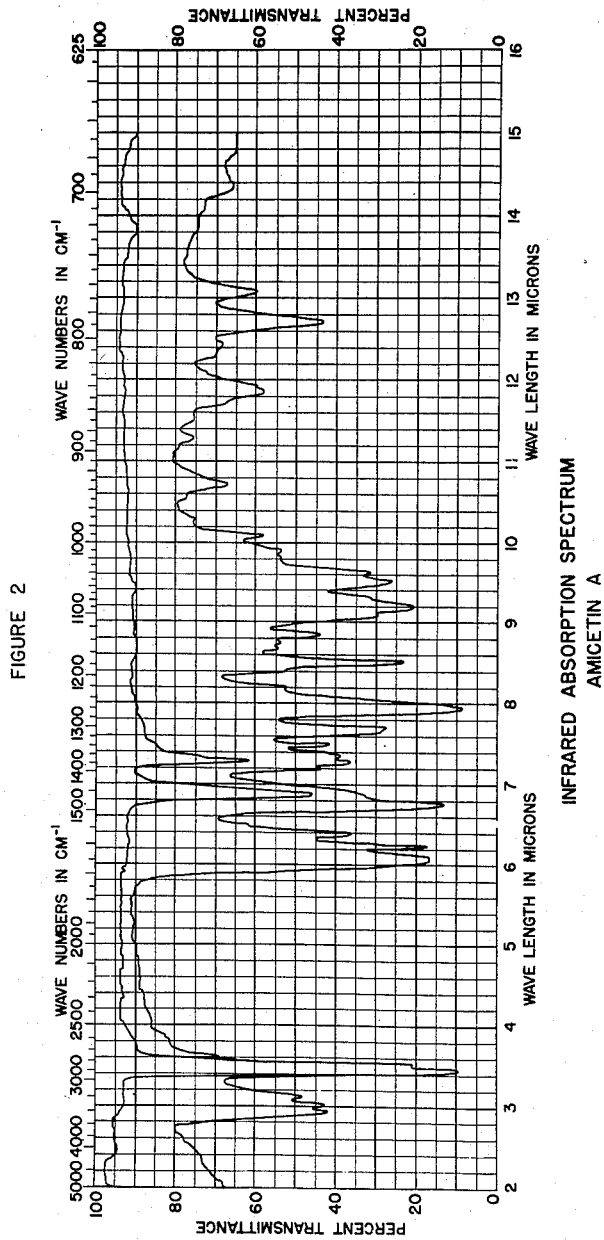

Figure 2 shows the infrared absorption spectrum made from a suspension of anhydrous crystalline amicetin A mulled in liquid petrolatum. It shows the following characteristic absorption bands in the infrared, expressed in reciprocal centimeters: 3430, 3340, 3225, 1650, 1567, 1604, 1480, 1337, 1303, 1175, 1132, 1087, 1055, 1040, 993, 938, 888, 843, 788, 764, 694. The individual bands at about 3430, 3340, and 3225 are characteristic of the O—H and N—H groups. The bands at 1650 and 1567 are characteristic of the mono-substituted amide carbonyl groups. The bands at 1604 and 1480 are characteristic of the unsaturated ring systems.

The Rf value of amicetin A (the ratio of movement of the liquid front to the movement of the antibiotic) is about 0.64 when n-butanol saturated with water is employed as the developing agent. When a mixture of ninety percent of n-butanol and ten percent of water is used as the developing agent, an Rf value of about 0.43 is observed.

Movement of antibiotic substances produced by the fermentation of *S. vinaceus-drappus* was obtained, on paper chromatography, according to the method of Peterson and Reineke, J. Am. Chem. Soc., 72, 3598 (1950), using n-butanol saturated with water.

The properties indicated above clearly show that amicetin A is different from any other known and previously characterized antibiotic material.

In order that the activity of the culture filtrates, extraction fractions, and the crude, purified, or crystalline preparations of amicetin A could be easily and routinely evaluated, an agar plate assay procedure was employed using *M. avium* (7992) as a test organism and pure streptomycin sulfate as the assay standard. An *M. avium* unit of activity (or more simple, a unit of activity) as herein used is defined as an equivalent of one microgram of pure streptomycin free base. The assay procedure is based on that of Loo et al., J. Bact., 50, 701 (1945). The agar medium consists of trypticase soy broth, thirty grams (trypticase is a peptone derived from casein by pancreatic digestion); agar, twenty grams; beef extract, 3.0 grams; Tween 80, 0.1 milliliter; and sufficient water to make a volume of one liter. The test solution is applied to ¼-inch filter paper disks (Whatman) and the plates are incubated at 37 degrees centigrade for sixteen to eighteen hours. The range of the assay curve is from 6.25 units per milliliter to 100 units per milliliter.

The following examples illustrate the formation, recovery, concentration, purification, crystallization and identification of amicetin A. These examples are merely illustrative in nature and are not to be construed as limiting.

EXAMPLE 1.—FORMATION AND RECOVERY OF AMICETIN A

To a 500-milliliter Erlenmeyer flask is added 100 milliliters of a seed medium containing the following ingredients:

| | Grams |
|---|---|
| Glucose monohydrate | 10 |
| Difco, bacto-peptone | 5 |
| Difco, beef extract | 10 |
| Sodium chloride | 5 |
| Tap water to 1000 cc. | |

NOTE.—Difco, bacto-peptone is a product of high peptone and amino acid content containing a negligible quantity only of proteoses and complex nitrogenous constituents. Difco, beef extract is a specifically prepared beef extract standardized to give uniform results. It is prepared by cooking waste meat products in water, filtering, and concentrating the filtrate to the consistency of a paste.

The flask and its contents are sterilized by autoclaving for a period of twenty minutes at a temperature of 120 degrees centigrade. After cooling, the flask is inoculated with a loopful of *S. vinaceous-drappus* spore suspension obtained from a casein-starch agar slant and the inoculated flask is shaken on a reciprocating shaker at the rate of ninety four-inch strokes per minute for a period of 24 hours at a temperature of thirty degrees centigrade.

At the end of this period, 25 milliliters of the vegetative growth thus-obtained is used to inoculate a 22-liter sweepstirrer seed bottle charged with twelve liters of the above-indicated medium. (Prior to inoculation, the container and its contents are sterilized by autoclaving for one hour at a temperature of 120 degrees centigrade.) The inoculated medium is fermented with an air flow of ten liters per minute and at a temperature of 26 degrees centigrade. At the end of a 48-hour period, the fermented material is used to inoculate a 100 gallon tank charged with 240 liters of the following medium:

| | |
|---|---|
| Glucose monohydrate | grams 25 |
| Soybean meal | do 25 |
| Pabst yeast (debittered yeast) | do 5 |
| Sodium chloride | do 5 |
| Calcium carbonate | do 2 |
| Cobaltous chloride hydrate | milligrams 4 |
| Tap water to 1 liter. | |

The tank is sterilized prior to inoculation by heating for a period of twenty minutes at a temperature of 120 degrees centigrade. The fermentation is conducted at 28 degrees centigrade and the medium aerated at a rate of about 220 cubic feet per hour. The fermentation medium is harvested after a period of 88 hours.

A 7.5-liter aliquot portion of the filtered harvested beer (assaying 83 *M. avium* units per milliliter) is treated with 2250 grams of sodium chloride and extracted at a pH of 9.3 with two 1500-milliliter portions of amyl acetate. (Spent beer assay shows that eighty percent of the activity is transferred to the amyl acetate portion.) The amyl acetate solution containing the antibiotic activity is successively extracted with 200 milliliters of 0.15 N hydrochloric acid and two 200-milliliter portions of 0.075 N hydrochloric acid. The aqueous solutions thus obtained are combined, treated with 180 grams of sodium chloride, and extracted at a pH of 9.2 with three seventy-milliliter portions of amyl acetate. The organic extracts are combined, clarified by filtration, and extracted with three 25-milliliter portions of 0.1 N hydrochloric acid. The combined aqueous extract is adjusted to a pH of 8.6, concentrated in vacuo to a volume of about forty milliliters and, after refrigerating for three days, 383 milligrams of crude crystalline amicetin A is obtained. The product thus obtained is further purified by dissolving in methanol, decolorizing with activated charcoal, adding water thereto and allowing the solution to crystallize. The purified crystals of amicetin A thus obtained are pale yellow in color, assay 425 *M. avium* units per milligram and melt between 209 and 212 degrees centigrade on a Kofler microhotstage. The following results are obtained on analysis:

*Analysis.*—Calc. for $C_{31}H_{42}N_6O_8$: C, 59.41; H, 6.76; N, 13.41. Found: C, 59.03, 59.24; H, 6.00, 6.74; N, 13.32, 13.52.

EXAMPLE 2.—FORMATION AND RECOVERY OF AMICETIN A

To a 500-milliliter Erlenmeyer flask is added 100 milliliters of the seed medium described in Example 1, and the flask and its contents are sterilized by autoclaving for twenty minutes at 120 degrees centigrade. After cooling, the flask is inoculated with a loopful of a *Streptomyces vinaceus-drappus* spore suspension obtained from a casein-starch agar slant, and the inoculated flask is incubated at thirty degrees centigrade on a reciprocating shaker operating at the rate of ninety four-inch strokes per minute.

After a period of 48 hours, 25 milliliters of the formed vegetative growth is used to inoculate a five-gallon sweep-stirrer charged with twelve liters of the sterilized medium indicated supra. The fermentation is conducted at a temperature of 26 degrees centigrade for a period of 48 hours with an air flow of ten liters per minute. The contents of the sweepstirrer are used to inoculate a 100-gallon tank charged with 240 liters of the medium described in Example 1. (Prior to inoculation, the tank and medium are sterilized by heating at a temperature of 120 degrees centigrade for twenty minutes.) The fermentation is conducted at a temperature of 32 degrees centigrade with an air flow of 150 cubic feet per hour.

After a period of 88 hours, the fermentation medium is harvested and the beer is filtered using Dicalite 4200 (a diatomaceous silica sold by The Great Lakes Carbon Corporation, Chicago, Illinois) as the filter aid. Sixty-five gallons of filtered beer assaying 118 *M. avium* units per milliliter are obtained. The beer is adjusted to a pH of 8.0 to 8.5 with a sodium hydroxide solution followed by extraction in a Podbielniak extractor with sixty liters of n-butanol. The butanol solution is extracted batchwise with three six-liter portions of dilute sulfuric acid, the solution thus-obtained adjusted to a pH of 8.2 and then extracted with n-butanol. The resulting solution is extracted with dilute acid and the acid extract thus-obtained is adjusted to a pH of 7.0 and freeze-dried to yield 24.6 grams of a white powder assaying 230 *M. avium* units per milligram. The crude product thus-obtained is dissolved in 400 milliliters of 0.1 N hydrochloric acid, the solution is filtered and the filtrate adjusted to a pH of 6.6. The brown amorphous precipitate thus-obtained is removed by filtration, the filtrate is adjusted to a pH of 8.4, seeded and then refrigerated overnight. A crystalline material separates and is collected and dried. The product is recrystallized from methanol and water to yield 3.08 grams of amicetin A in the form of pale yellow platelets melting at 209 to 212 degrees centigrade and assaying about 380 *M. avium* units per milligram.

EXAMPLE 3.—PREPARATION OF THE HYDROCHLORIDE OF AMICETIN A

Crystalline amicetin A (1.88 grams) is dissolved in 100 milliliters of 0.05 N. hydrochloric acid. The resulting pale yellow solution is filtered and freeze-dried. The dried powder thus-obtained is dissolved in a solution containing ten milliliters of methanol, eight milliliters of water and two milliliters of 0.05 N hydrochloric acid. During the portionwise addition of 100 milliliters of acetone to the resulting solution, while crystals are formed. After cooling overnight, the crystals are collected and recrystallized from a water-methanol mixture. A yield of 1.62 grams of anicetin A hydrochloride is obtained assaying 350 *M. avium* units per milligram.

EXAMPLE 4.—PREPARATION OF THE HELIANTHATE OF AMICETIN A

A solution of 56 milligrams of amicetin A in 25 milliliters of dilute hydrochloric acid is adjusted to pH 5.6 by careful addition of a dilute sodium hydroxide solution. To this solution is added 101 milligrams of methyl orange dissolved in 25 milliliters of warm water. A precipitate separates slowly. After three hours of cooling at four degrees centigrade, the crystalline precipitate is collected and dried to yield 98 milligrams of the helianthate of amicetin A. About 85 milligrams of this product is recrystallized from aqueous methanol to yield 65 milligrams of a red-orange crystalline material which exhibits a loss of birefringence between 163 and 165 degrees centigrade when viewed under a polarizing microscope and decomposes above 210 degrees centigrade. The helianthate of anicetin A thus-prepared assays 167 *M. avium* units per milligram.

*Analysis.*—Calc. for $C_{59}H_{72}N_{12}O_{14}S_2$: C, 57.26; H, 5.87; N, 13.58; S, 5.18. Found: C, 56.92, 56.49; H, 6.46, 6.89; N, 13.54; S, 4.30.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. Amicetin A, a substance characterized by being effective in inhibiting the growth of mycobacteria, capable of forming salts with acids, and sparingly soluble in water and methanol, and in its essentially pure crystalline form by melting between 209 and 212 degrees centigrade by having an empirical formula corresponding to the following analysis: C, 59.24; H, 6.74; N, 13.52; by having an ultraviolet absorption spectrum in aqueous solution exhibiting maxima of $$E^{1\%}_{1 cm.} = 290$$

at 251 millimicrons and $$E^{1\%}_{1 cm.} = 540$$

at 320 millimicrons and minima of $$E^{1\%}_{1 cm.} = 236$$

at 230 millimicrons and $$E^{1\%}_{1 cm.} = 176$$

at 272 millimicrons and, in a 0.1 N hydrochloric acid solution, maxima of $$E^{1\%}_{1 cm.} = 341$$

at 256 millimicrons and $$E^{1\%}_{1 cm.} = 288$$

at 313 millimicrons; by exhibiting a characteristic absorption in the infrared region of the spectrum when suspended in mineral oil, at the following frequencies expressed in reciprocal centimeters. 3430, 3340, 3225, 1650, 1604, 1567, 1480, 1337, 1303, 1175, 1132, 1087, 1055, 1040, 993, 938, 888, 843, 788, 764, 694; and by having a specific rotation $[\alpha]_D^{22°}$ in 0.1 N hydrochloric acid solution of plus 138.8 degrees at a concentration of 0.5 percent.

2. A substance selected from the class consisting of amicetin A as characterized in claim 1 and the acid addition salts thereof.

3. An acid addition salt of amicetin A as characterized in claim 1.

4. The hydrochloride of amicetin A as characterized in claim 1.

5. A composition of matter consisting of amicetin A as characterized in claim 1.

References Cited in the file of this patent

UNITED STATES PATENTS 2,516,080 Sobin _____ July 18, 1950

OTHER REFERENCES

Waksman et al.: "The Actinomycetes and Their Antibiotics," pub. Wilkins and Williams, Balt., Md., pp. 170–184, 190, 217.

Sawozski: J. of Antibiotics (Japan), vol. 8, No. 2, Ser. A, pp. 39–41.

Klarman: Am. J. Pharm., July 1955, pp. 252–254.

Stevenson: Nature, September 25, 1954, pp. 598–599.

Johnson et al.: "Mycomycin," J. Bact. 54 (1947), p. 281.

Waksman et al.: Science, March 25, 1949, vol. 109, No. 2830, pp. 305–307.

(Other references on following page)

OTHER REFERENCES

Robertson et al.: Antibiotics, Lippincott, Phila., 1949, p. 119.

Science News Letter for March 1951, p. 130.

Waksman: The Actinomycetes, pp. 116–117, pub. Chronica Botanica Co., Waltham, Mass., 1950.

Hinman et al.: J.A.C.S., vol. 75, 1953, pp. 499, 500, 5864–5871.

McCormick et al.: Antibiotics and Chemotherapy, July 1953, pp. 718–720.